(12) United States Patent
Yagi et al.

(10) Patent No.: US 11,668,353 B2
(45) Date of Patent: Jun. 6, 2023

(54) METHOD FOR MANUFACTURING WET FRICTION PLATE, WET FRICTION PLATE, AND WET MULTIPLE-PLATE CLUTCH DEVICE HAVING WET FRICTION PLATE

(71) Applicant: Kabushiki Kaisha F.C.C., Hamamatsu (JP)

(72) Inventors: Shintaro Yagi, Shizuoka (JP); Katsumasa Kiuchi, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/274,709

(22) PCT Filed: Jan. 31, 2019

(86) PCT No.: PCT/JP2019/003428
§ 371 (c)(1),
(2) Date: Mar. 9, 2021

(87) PCT Pub. No.: WO2020/059166
PCT Pub. Date: Mar. 26, 2020

(65) Prior Publication Data
US 2022/0049745 A1 Feb. 17, 2022

(30) Foreign Application Priority Data

Sep. 21, 2018 (JP) .............................. JP2018-176803

(51) Int. Cl.
*F16D 13/74* (2006.01)
*F16D 13/64* (2006.01)
(Continued)

(52) U.S. Cl.
CPC .......... *F16D 13/648* (2013.01); *B23K 26/009* (2013.01); *B23K 26/364* (2015.10);
(Continued)

(58) Field of Classification Search
CPC ........ F16H 13/00–74; F16D 69/00–2069/0491
See application file for complete search history.

(56) References Cited

U.S. PATENT DOCUMENTS 9,346,128 B2    5/2016 Moch et al.
2002/0153213 A1* 10/2002 Gruber .................... C04B 35/83
                                                         188/218 XL
(Continued)

FOREIGN PATENT DOCUMENTS

JP    7-224870 A    8/1995
JP    2004-2941 A   1/2004
(Continued)

OTHER PUBLICATIONS

Extended European Search Report (EESR) dated Jun. 7, 2022 for corresponding European Patent Application No. 19861742.5.
(Continued)

*Primary Examiner* — Ernesto A Suarez
*Assistant Examiner* — Lillian T Nguyen
(74) *Attorney, Agent, or Firm* — Rankin, Hill & Clark LLP

(57) ABSTRACT

Provided are a method for manufacturing a wet friction plate, whereby efficiency of the work of forming a fine groove on a friction material can be improved, the wet friction plate, and a wet multiple-plate clutch device having the wet friction plate. In the method for manufacturing a wet friction plate 200, a core metal 201 and a friction material 210 are prepared, a resin layer 203 is formed on the core metal, the friction material is attached onto the resin layer, and a fine groove 211 is formed in the friction material. Specifically, irradiation of a laser beam L is started on an exposed portion 205 of the core metal. A laser head 301 is displaced in an annular shape while continuously emitting the laser beam. Thus, annular fine grooves 204 and 211 are (Continued)

formed in the exposed portion of the core metal and the friction material.

8 Claims, 9 Drawing Sheets

(51) Int. Cl.
  *B23K 26/364* (2014.01)
  *B23K 26/00* (2014.01)
  *F16D 13/52* (2006.01)
  *F16D 69/04* (2006.01)
  *B23K 101/34* (2006.01)
(52) U.S. Cl.
  CPC .............. *F16D 13/52* (2013.01); *F16D 13/74* (2013.01); *F16D 69/04* (2013.01); *B23K 2101/34* (2018.08); *F16D 2069/0491* (2013.01)

(56) References Cited

U.S. PATENT DOCUMENTS

| | | | |
|---|---|---|---|
| 2002/0162618 A1 | 11/2002 | Landa et al. | |
| 2006/0204777 A1* | 9/2006 | Landa | F16D 69/04 428/626 |
| 2013/0168199 A1 | 7/2013 | Higashijima et al. | |
| 2016/0025158 A1* | 1/2016 | Kobayashi | F16D 13/52 192/70.12 |

FOREIGN PATENT DOCUMENTS

| | | | |
|---|---|---|---|
| JP | 2006-29446 A | 2/2006 | |
| JP | 2006-82296 A | 3/2006 | |
| JP | 2007-263203 A | 10/2007 | |
| JP | 2011-1996 A | 1/2011 | |
| JP | 2014-133242 A | 7/2014 | |
| JP | 2020-51613 A | 4/2020 | |
| KR | 100773831 B1 * | 11/2007 | ............. F16D 69/00 |
| WO | WO-2011074481 A1 * | 6/2011 | ........... F16D 13/648 |
| WO | 2011/118347 A1 | 9/2011 | |

OTHER PUBLICATIONS

International Search Report (ISR) dated Apr. 9, 2019 filed in PCT/JP2019/003428.
Japanese Office Action (JPOA) dated May 7, 2019 for the corresponding Japanese Patent Application No. 2018-176803 and its English translation.
Japanese Office Action (JPOA) dated Aug. 6, 2019 for the corresponding Japanese Patent Application No. 2018-176803 and its English translation.
Japanese Office Action (JPOA) dated Aug. 27, 2019 for the corresponding Japanese Patent Application No. 2018-176803 and its English translation.
Japanese Office Action (JPOA) dated Nov. 5, 2019 for the corresponding Japanese Patent Application No. 2018-176803 and its English translation.

* cited by examiner

METHOD FOR MANUFACTURING WET FRICTION PLATE, WET FRICTION PLATE, AND WET MULTIPLE-PLATE CLUTCH DEVICE HAVING WET FRICTION PLATE

TECHNICAL FIELD

The present invention relates to a wet friction plate used in a lubricating oil. The present invention particularly relates to the wet friction plate suitable for a wet multiple-plate clutch device, and the wet multiple-plate clutch device having the wet friction plate. The wet multiple-plate clutch device is disposed between a prime mover and a driven body rotationally driven by the prime mover to transmit or cut off a driving force of the prime mover to the driven body.

BACKGROUND ART

Conventionally, vehicles such as four-wheeled vehicles and two-wheeled vehicles are equipped with a wet multiple-plate clutch device in order to transmit or cut off a rotational driving force of the prime mover such as an engine to the driven body such as a wheel. Generally, in the wet multiple-plate clutch device, the rotational driving force is transmitted or cut off by pressing two plates arranged to face each other in the lubricating oil against each other.

In this case, one of the two plates includes the wet friction plate in which a friction material is provided in a circumferential direction on a surface of a flat plate annular core metal. For example, in a friction plate (hereinafter referred to as a "wet friction plate") in a laser processing method of a friction plate, and in the friction plate in a laser processing apparatus disclosed in PATENT LITERATURE 1 below, a recess (hereinafter referred to as a "fine groove") formed of minute irregularities or a groove is formed on a surface of the friction material by a laser beam. Thus, the wet friction plate can control retention property and discharge property of the lubricating oil on the friction material.

CITATION LIST

Patent Literature

PATENT LITERATURE 1: JP-A-2014-133242

However, in the laser processing method of the wet friction plate and the laser processing apparatus described in PATENT LITERATURE 1, since the fine groove is formed by irradiating a friction material portion on the wet friction plate with the laser beam, there is a problem that efficiency of work of forming the fine groove is low. In particular, in the wet friction plate in which the friction material is intermittently provided in the circumferential direction on the core metal of the wet friction plate, there is a problem that the work of positioning the core metal on a processing head on a processing stage and the control of repeating irradiation and interruption of the laser beam for each friction material on the core metal is complicated.

The present invention has been made to address the above problems. An object of the present invention is to provide a method for manufacturing a wet friction plate, whereby the efficiency of the work of forming the fine groove on the friction material can be improved, the wet friction plate, and a wet multiple-plate clutch device having the wet friction plate.

SUMMARY OF INVENTION

In order to achieve the object described above, a feature of the present invention is a method for manufacturing a wet friction plate in which a friction material is provided in a circumferential direction on a surface of a core metal formed in a flat plate annular shape, the method including: a friction material fixing step of attaching a plurality of the friction materials to the surface of the core metal; and a fine groove forming step of forming a recessed fine groove on a surface of the friction material by irradiating the core metal with laser beam while being displaced with respect to the core metal. In the fine groove forming step, the fine groove is formed on the surface of the friction material by continuously emitting the laser beam without interruption between an exposed portion of a plate surface of the core metal and the friction material.

According to the feature of the present invention configured as described above, in the method for manufacturing the wet friction plate, the fine groove is formed on the surface of the friction material by continuously emitting the laser beam without interruption between the exposed portion on the plate surface of the core metal and the friction material. Therefore, positioning accuracy of the core metal with respect to a laser head that emits the laser beam can be relaxed. Further, irradiation control of the laser beam can also be simplified. Therefore, the efficiency of the work of forming the fine groove on the friction material can be improved. In this case, the fine groove is formed in a shape that a portion dug in a recessed cross-sectional shape having a groove width of 1000 μm or less and 10 μm or more, a depth of 1000 μm or less and 10 μm or more, extends intermittently or continuously long.

Further, another feature of the present invention is the method for manufacturing the wet friction plate, in which in the friction material fixing step, the friction materials are arranged on the surface of the core metal with a gap in the circumferential direction and attached onto the core metal, and in the fine groove forming step, the fine groove is formed on the surface of the friction material by continuously emitting the laser beam without interruption between the gap on the core metal and the friction material.

According to the other feature of the present invention configured as described above, in the method for manufacturing the wet friction plate, the fine groove is formed on the surface of the friction material by continuously emitting the laser beam without interruption between the gap between the friction materials and the friction material. Therefore, the positioning accuracy of the core metal with respect to the laser head that emits the laser beam can be relaxed. Further, the irradiation control of the laser beam can be simplified. Therefore, the efficiency of the work of forming the fine groove on the friction material can be improved.

Another feature of the present invention is that in the method for manufacturing the wet friction plate, in the fine groove forming step, when the laser beam is irradiated onto the core metal, the laser beam is started to be emitted outside the core metal.

According to another feature of the present invention configured as described above, in the method for manufacturing the wet friction plate, in the fine groove forming step, when the laser beam is irradiated onto the core metal, the laser beam is started to be emitted outside the core metal. Therefore, since the exposed portion or the friction material on the core metal is prevented from being irradiated with unstable laser beam at the time of emission and immediately after the emission, the fine groove can be stably formed.

Another feature of the present invention is that in the method for manufacturing the wet friction plate, in the fine groove forming step, when the laser beam is irradiated onto the friction material, the laser beam is started to be emitted at the exposed portion of the core metal.

According to another feature of the present invention configured as described above, in the method for manufacturing the wet friction plate, in the fine groove forming step, when the laser beam is irradiated onto the core metal, the laser beam is started to be emitted at the exposed portion of the core metal. Therefore, since the friction material on the core metal is prevented from being irradiated with the unstable laser beam at the time of emission and immediately after the emission, the fine groove can be stably formed.

Another feature of the present invention is that the method for manufacturing the wet friction plate includes a resin layer forming step of forming a resin layer by applying a resin material to at least a part of the exposed portion of the core metal prior to the fine groove forming step.

According to another feature of the present invention configured as described above, in the method for manufacturing the wet friction plate, the resin layer forming step of forming the resin layer made of a layer of the resin material on at least a part of the exposed portion of the core metal is performed prior to the fine groove forming step. Therefore, it is possible to prevent or reduce formation of the fine groove in the exposed portion of the core metal.

Another feature of the present invention is that in the method for manufacturing the wet friction plate, the resin layer forming step is performed prior to the friction material fixing step, and in this step, the resin layer is formed on an entire surface of the core metal, and in the friction material fixing step, the friction material is attached onto the resin layer.

According to another feature of the present invention configured as described above, in the method for manufacturing the wet friction plate, the resin layer forming step is performed prior to the friction material fixing step, and in this step, the resin layer is formed on the entire surface of the core metal. Therefore, the resin layer can be easily and quickly formed on the surface of the core metal.

Another feature of the present invention is that in the method for manufacturing the wet friction plate, in the resin layer forming step, the resin layer is formed to be transparent or translucent to the extent that the surface of the core metal can be visually recognized.

According to another feature of the present invention configured as described above, in the method for manufacturing the wet friction plate, the resin layer is formed to be transparent or translucent to the extent that the surface of the core metal can be visually recognized. Therefore, since the exposed portion on the surface of the core metal can be visually recognized, appearance inspection of the wet friction plate is not hindered. Further, it is possible to confirm how much of the fine groove is formed in the exposed portion on the surface of the core metal by irradiating the laser beam.

Another feature of the present invention is that the method for manufacturing the wet friction plate further includes a resin layer removing step of removing the resin layer exposed on the core metal.

According to another feature of the present invention configured as described above, in the method for manufacturing the wet friction plate, the resin layer removing step of removing the resin layer exposed on the core metal is further performed. Therefore, it is possible to prevent an increase in weight due to formation of the resin layer and deterioration in appearance due to the resin layer remaining.

According to another feature of the present invention configured as described above, in the method for manufacturing the wet friction plate, in the fine groove forming step, the fine groove is formed to extend spirally in the circumferential direction in the core metal.

According to another feature of the present invention configured as described above, in the method for manufacturing the wet friction plate, the fine groove is formed to extend spirally in the circumferential direction in the core metal. Therefore, the fine groove can be continuously formed by continuously irradiating the laser beam without interruption. Therefore, a homogeneous fine groove can be formed in a short time.

The present invention can be implemented not only as an invention of the method for manufacturing the wet friction plate, but also as an invention of the wet friction plate, and the wet multiple-plate clutch including the wet friction plate.

Specifically, the wet friction plate is a wet friction plate in which a friction material is provided in a circumferential direction on a surface of a core metal formed in a flat plate annular shape, and a recessed fine groove may be formed in both an exposed portion of a plate surface of the core metal and the friction material in a state of being continuously connected in a plan view between the exposed portion and the friction material. According to the wet friction plate configured as described above, the same operational effects as the method for manufacturing the wet friction plate can be expected.

In this case, in the wet friction plate, preferably, regarding the frictional material, a plurality of the friction materials is provided in the circumferential direction on the surface of the core metal with a gap interposed therebetween, and the fine groove is formed in a concave shape continuously connected in a plan view between the gap and the friction material on the core metal. According to the wet friction plate configured as described above, the same operational effects as the method for manufacturing the wet friction plate can be expected.

In these cases, in the wet friction plate, preferably, a resin layer made of a resin material is further formed on at least a part of the exposed portion of the core metal. According to the wet friction plate configured as described above, the same operational effects as the method for manufacturing the wet friction plate can be expected.

The wet friction plate is a wet friction plate in which a friction material is provided in a circumferential direction on a surface of a core metal formed in a flat plate annular shape, a recessed fine groove is formed in the friction material on the core metal, and a resin layer made of a resin material may be formed on at least a part of an exposed portion of a plate surface of the core metal. According to the wet friction plate configured as described above, the same operational effects as the method for manufacturing the wet friction plate can be expected.

In these cases, in the wet friction plate, preferably, the resin layer is formed on the entire surface of the core metal, and the friction material is attached onto the resin layer. According to the wet friction plate configured as described above, the same operational effects as the method for manufacturing the wet friction plate can be expected.

In these cases, in the wet friction plate, preferably, the resin layer is formed to be transparent or translucent to the extent that the surface of the core metal can be visually recognized. According to the wet friction plate configured as described above, the same operational effects as the method for manufacturing the wet friction plate can be expected.

In these cases, in the wet friction plate, preferably, the fine groove is formed to extend spirally in the circumferential direction in the core metal. According to the wet friction plate configured as described above, the same operational effects as the method for manufacturing the wet friction plate can be expected.

Specifically, in a wet multiple-plate clutch device in which an opposing plate is disposed to face a drive side plate that is rotationally driven by a prime mover through a gap and a lubricating oil, and a rotational driving force is transmitted or cut off between the two plates when the two plates are in close contact with each other or separated from each other, at least one of the drive side plate and the opposing plate may be the wet friction plate according to any one of the claimed inventions. According to the wet multiple-plate clutch device configured as described above, the same operational effects as the method for manufacturing the wet friction plate, and the wet friction plate can be expected.

DESCRIPTION OF EMBODIMENTS

Figure 1:
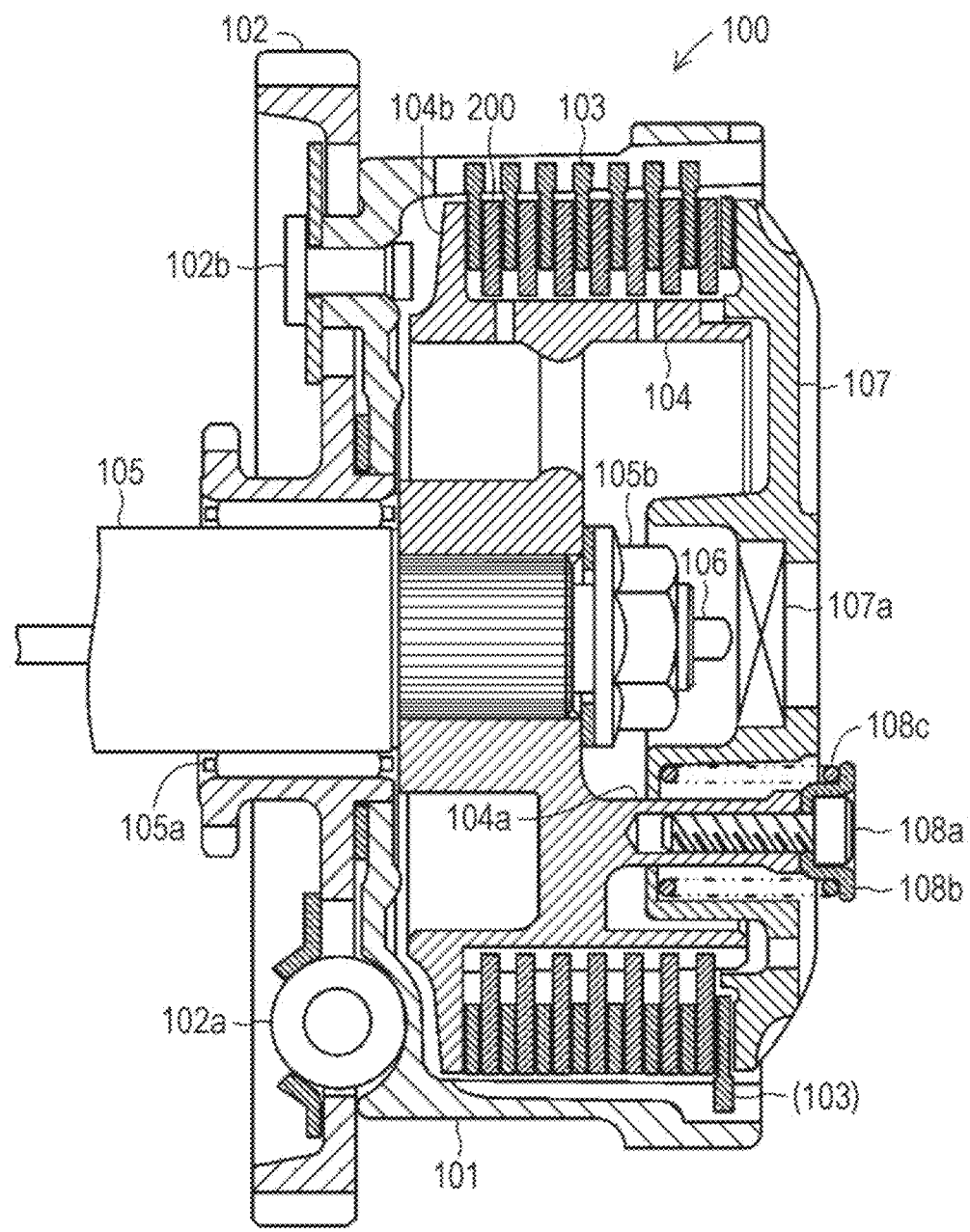
FIG. 1 is a cross-sectional view illustrating an overall configuration of a wet multiple-plate clutch device including a wet friction plate according to the present invention.
Figure 2:
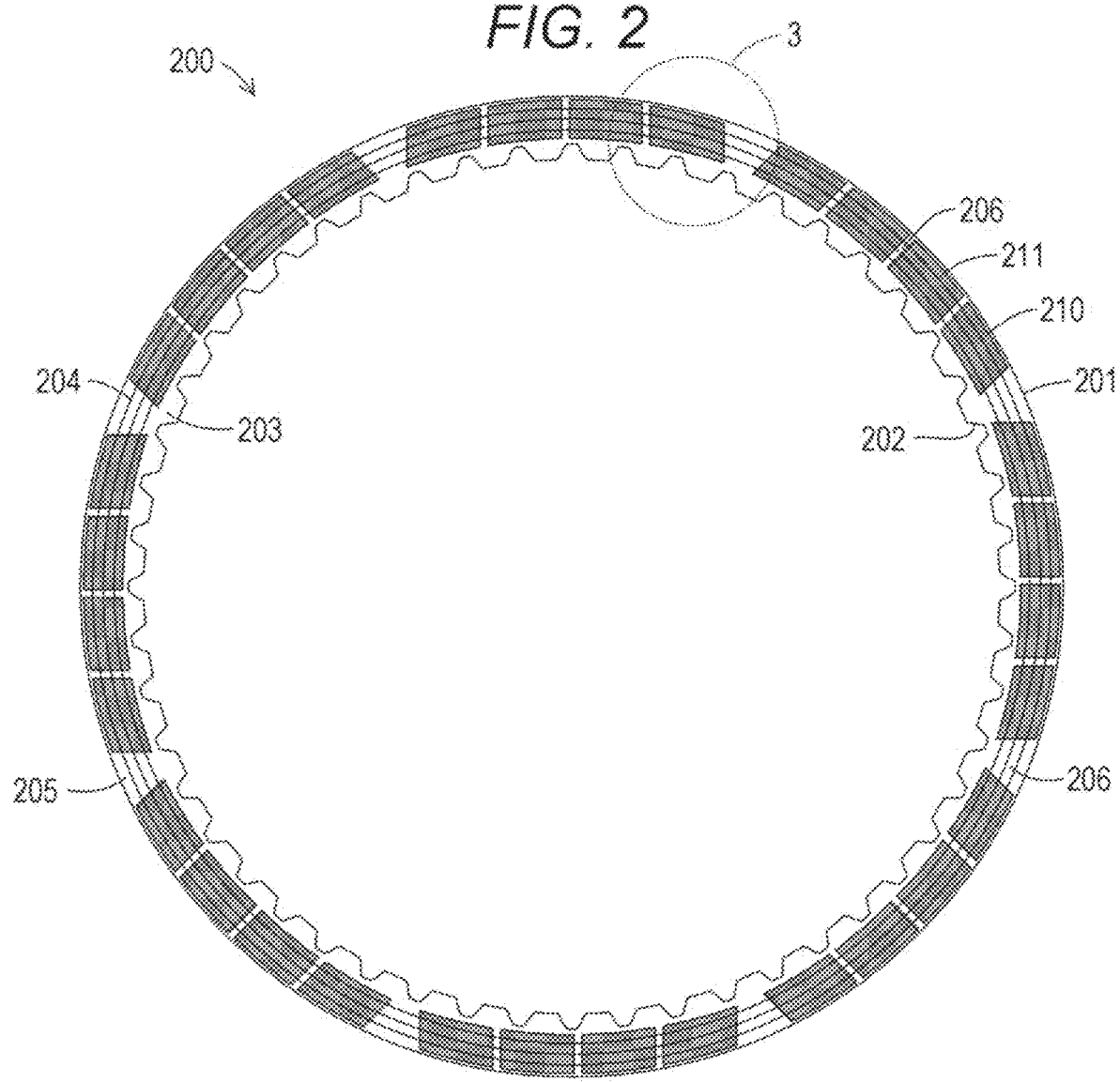
FIG. 2 is a plan view illustrating an outline of an external configuration of the wet friction plate according to the present invention, which is incorporated in the wet multiple-plate clutch device illustrated in FIG. 1.
Figure 3:
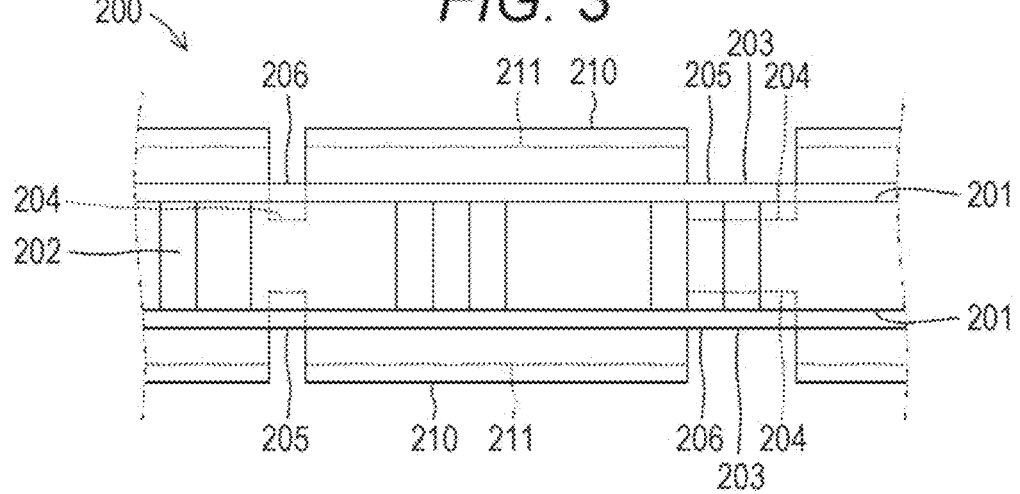
FIG. 3 is a partially enlarged side view of the wet friction plate schematically illustrating a configuration within a broken line circle 3 shown in FIG. 2 as viewed from the inside of a core metal.

Hereinafter, an embodiment of a wet friction plate, a wet multiple-plate clutch device having the wet friction plate, and a method for manufacturing the wet friction plate according to the present invention will be described with reference to the drawings. FIG. 1 is a cross-sectional view illustrating an outline of an overall configuration of a wet multiple-plate clutch device 100 having a wet friction plate 200 according to the present invention. FIG. 2 is a plan view illustrating an outline of an external configuration of the wet friction plate 200 according to the present invention included in the wet multiple-plate clutch device 100 illustrated in FIG. 1. FIG. 3 is a partially enlarged side view of the wet friction plate 200 schematically illustrating a configuration within a broken line circle 3 shown in FIG. 2 as viewed from the inside of a core metal 201. It should be noted that each of the drawings referred to in the present specification is schematically illustrated for facilitating understanding of the present invention, and for example, some components are exaggerated. Therefore, dimensions and ratios between the components may be different. The wet multiple-plate clutch device 100 is a mechanical device for transmitting or cutting off a driving force of an engine (not shown) which is a prime mover in a two-wheeled vehicle (motorcycle) to a wheel (not shown) which is a driven body. The wet multiple-plate clutch device 100 is disposed between the engine and a transmission (not shown).

(Configuration of Wet Multiple-Plate Clutch Device 100)

The wet multiple-plate clutch device 100 includes a housing 101 made of an aluminum alloy. The housing 101 is formed in a bottomed cylindrical shape, and is a member that constitutes a part of a housing of the wet multiple-plate clutch device 100. An input gear 102 is fixed to a left side surface of the housing 101 illustrated in the drawing by a rivet 102$b$ via a torque damper 102$a$. The input gear 102 is rotationally driven by meshing with a drive gear (not shown) that is rotationally driven by driving the engine. On an inner peripheral surface of the housing 101, a plurality of (eight in the present embodiment) clutch plates 103 is respectively held by spline fitting so that they can be displaced in an axial direction of the housing 101 and can rotate integrally with the housing 101.

The clutch plate 103 is a flat plate annular component that is pressed against the wet friction plate 200 described below. The clutch plate 103 is formed by punching a thin plate material made of an SPCC (cold rolled steel plate) material in an annular shape. Oil grooves (not shown) having a depth of several μm to several tens μm to hold a lubricating oil described below are respectively formed on both side surfaces (front and back surfaces) of the clutch plates 103. Further, each of the both side surfaces (front and back surfaces) of the clutch plate 103 in which the oil groove is formed is subjected to surface hardening treatment for the purpose of improving wear resistance. Since the surface hardening treatment is not directly related to the present invention, a description thereof will be omitted.

Inside the housing 101, a friction plate holder 104 formed in a substantially cylindrical shape is disposed concentrically with the housing 101. A large number of spline grooves are formed in the axial direction of the friction plate holder 104 on an inner peripheral surface of the friction plate holder 104. A shaft 105 is spline-fitted into the spline grooves. The shaft 105 is a shaft body formed in a hollow shape. One end (A right end in the drawing) of the shaft 105 rotatably supports the input gear 102 and the housing 101 via a needle bearing 105$a$, and fixedly supports the friction plate holder 104 to fit the spline via a nut 105$b$. That is, the friction plate holder 104 rotates integrally with the shaft 105. On the other hand, the other end (left end in the drawing) of the shaft 105 is connected to the transmission (not shown) in the two-wheeled vehicle.

In a hollow portion of the shaft 105, a shaft-like push rod 106 is disposed to penetrate the one end (right end in the drawing) of the shaft 105 in a state of protruding therefrom.

An end (A left end of the drawing) opposite to an end of the push rod 106 protruding from the one end (right end of the drawing) of the shaft 105 is connected to a clutch operating lever (not shown) of the two-wheeled vehicle. The push rod 106 slides in the hollow portion of the shaft 105 in the axial direction of the shaft 105 by operating the clutch operating lever.

On an outer peripheral surface of the friction plate holder 104, a plurality of (seven in this embodiment) wet friction plates 200 is respectively held by spline fitting so that they can be displaced in the axial direction of the friction plate holder 104 and can rotate integrally with the friction plate holder 104 with the clutch plates 103 interposed therebetween.

On the other hand, a predetermined amount of the lubricating oil (not shown) is filled in the friction plate holder 104, and three tubular support columns 104a are formed therein (only one is shown in the drawing). The lubricating oil is supplied between the wet friction plate 200 and the clutch plate 103 to absorb frictional heat generated between the wet friction plate 200 and the clutch plate 103 and prevent a friction material 210 from being worn.

The three tubular support columns 104a are formed to project outward (rightward in the drawing) in the axial direction of the friction plate holder 104. A pressing cover 107, which is disposed concentrically with the friction plate holder 104, is assembled via bolts 108a, receiving plates 108b, and coil springs 108c. The pressing cover 107 is formed in a substantially disk shape having an outer diameter substantially the same as the outer diameter of the wet friction plate 200. The pressing cover 107 is pressed toward the friction plate holder 104 by the coil springs 108c. A release bearing 107a is provided at a position facing the right end in the drawing of the push rod 106, at an inner center of the pressing cover 107.

(Configuration of Wet Friction Plate 200)

As illustrated in FIG. 2 in detail, the wet friction plate 200 is configured to include oil grooves 206 and friction materials 210 on a flat plate annular core metal 201. The core metal 201 is a member that serves as a base of the wet friction plate 200. The core metal 201 is formed by punching the thin plate material made of the SPCC (cold rolled steel plate) material in a substantially annular shape. In this case, an internal tooth-shaped spline 202 to be spline-fitted with the friction plate holder 104 is formed on an inner peripheral portion of the core metal 201.

A side surface of the wet friction plate 200 facing the clutch plate 103, that is, a ring-shaped plate surface of the core metal 201 facing the clutch plate 103, is provided with a plurality of (32 pieces in this embodiment) small piece-shaped friction members 210 via a resin layer 203, in a circumferential direction of the core metal 201 via the oil grooves 206 formed of gaps.

The resin layer 203 is a portion for preventing or reducing formation of a fine groove 204 in the plate surface of the core metal 201 by the laser beam used when forming a fine groove 211 in the friction material 210, and for fixing the friction material 210 on the core metal 201. More specifically, the resin layers 203 include an adhesive made of a thermosetting resin, and are respectively formed on entire both surfaces of the core metal 201 with a substantially uniform thickness. In this case, the resin layers 203 are also formed respectively on both side surfaces of the spline 202.

The resin layer 203 is formed to have a thickness that can fix the friction material 210 on the core metal 201 and can prevent or reduce the formation of the fine groove 204 in the plate surface of the core metal 201. Specifically, the resin layer 203 is preferably 1 μm or more and 30 μm or less, and more preferably 2 μm or more and 10 μm or less. In this embodiment, the resin layer 203 is formed to have a thickness of 6 μm from the surface of the core metal 201. In this case, the resin layer 203 is formed to be transparent or translucent to the extent that the surface of the core metal 201 can be visually recognized by a human.

As the thermosetting resin constituting the resin layer 203, a phenol resin, a modified phenol resin, an epoxy resin, a urea resin, an unsaturated polyester resin, a polyurethane resin, or a polyimide resin can be used. In this embodiment, the resin layer 203 is made of a phenol resin. Further, as the resin constituting the resin layer 203, various elastomers (for example, nitrile rubber-based or chloroprene rubber-based) can be used in addition to the thermosetting resin. In the cases, the resin constituting the resin layer 203 does not necessarily have to have adhesiveness. That is, the resin layer 203 may be made of at least a resin capable of preventing or reducing the formation of the fine groove 204 in the plate surface of the core metal 201. As a material for fixing the friction material 210 on the core metal 201, an adhesive made of a substance different from the resin constituting the resin layer 203 may be used.

The fine groove 204 is a portion on the core metal 201 that is concavely removed when the fine groove 211 is formed on the surface of the friction material 210. The fine groove 204 is formed in a groove shape extending arcuately so as to be continuously connected to the fine groove 211 in a plan view of the wet friction plate 200, on a portion other than a portion covered with the friction material 210 on the surface of the core metal 201 provided with the friction material 210, that is, on an exposed portion 205 on the plate surface of the core metal 201. In this embodiment, the fine groove 204 is formed so that a groove width thereof is about 100 μm, a depth of the deepest portion is about 10 μm, and a cross-sectional shape thereof is an arc shape. The fine grooves 204 are formed to form three annular rings in a plan view of the wet friction plate 200, together with the fine grooves 211. In this case, the three annular rings are configured to be concentric rings centered on a core of the core metal 201.

The oil groove 206 is a flow path for guiding the lubricating oil between an inner peripheral edge and an outer peripheral edge of the core metal 201 of the wet friction plate 200. Further, the oil groove 206 is also an oil holding portion for allowing the lubricating oil to be present between the wet friction plate 200 and the clutch plate 103. The oil groove 206 is formed as a gap between the friction materials 210 adjacent to each other. In this embodiment, the oil grooves 206 include fan-shaped portions between four small pieces of friction materials 210 and four small pieces of friction materials 210, and portions formed to extend linearly between the four friction materials 210 arranged between two fan-shaped oil grooves 206.

The friction material 210 increases a frictional force against the clutch plate 103. The friction material 210 is made of a small piece of paper material attached in the circumferential direction of the core metal 201. In the present embodiment, the friction materials 210 are configured such that eight groups of small pieces are arranged in the circumferential direction of the core metal 201 via eight fan-shaped oil grooves 206, and in the group of small pieces, four quadrangular pieces extending in the circumferential direction of the core metal 201 are arranged in the circumferential direction of the core metal 201 via three linear oil grooves 206. The fine groove 211 is formed on the surface of the friction material 210. Note that the friction material 210 may be made of a material capable of increasing the frictional force between the wet friction plate 200 and the clutch plate 103. The friction material 210 can be made of a material other than the paper material, for example, a cork material, a rubber material, a glass material, or the like.

The fine groove 211 is a portion for defining retention property and discharge property of the lubricating oil on the friction material 210. The fine groove 211 is formed in a concave shape on the surface of the friction material 210. In this embodiment, the fine groove 211 is formed in a groove shape extending arcuately in the circumferential direction of the core metal 201. In this case, in the present embodiment, the fine groove 211 is formed so that the groove width is about 100 μm, the depth of the deepest portion is about 200 μm, and the cross-sectional shape is the arc shape. The fine grooves 211 are formed to form the three annular rings in a plan view of the wet friction plate 200, together with the fine grooves 204. In this case, the three annular rings are configured to be concentric rings centered on the core of the core metal 201. As a matter of course, the cross-sectional shape of the fine grooves 204 and 211 may be a shape other than the arc shape, for example, a rectangular shape or a triangular shape.

(Manufacturing of Wet Friction Plate 200)

Figure 4:
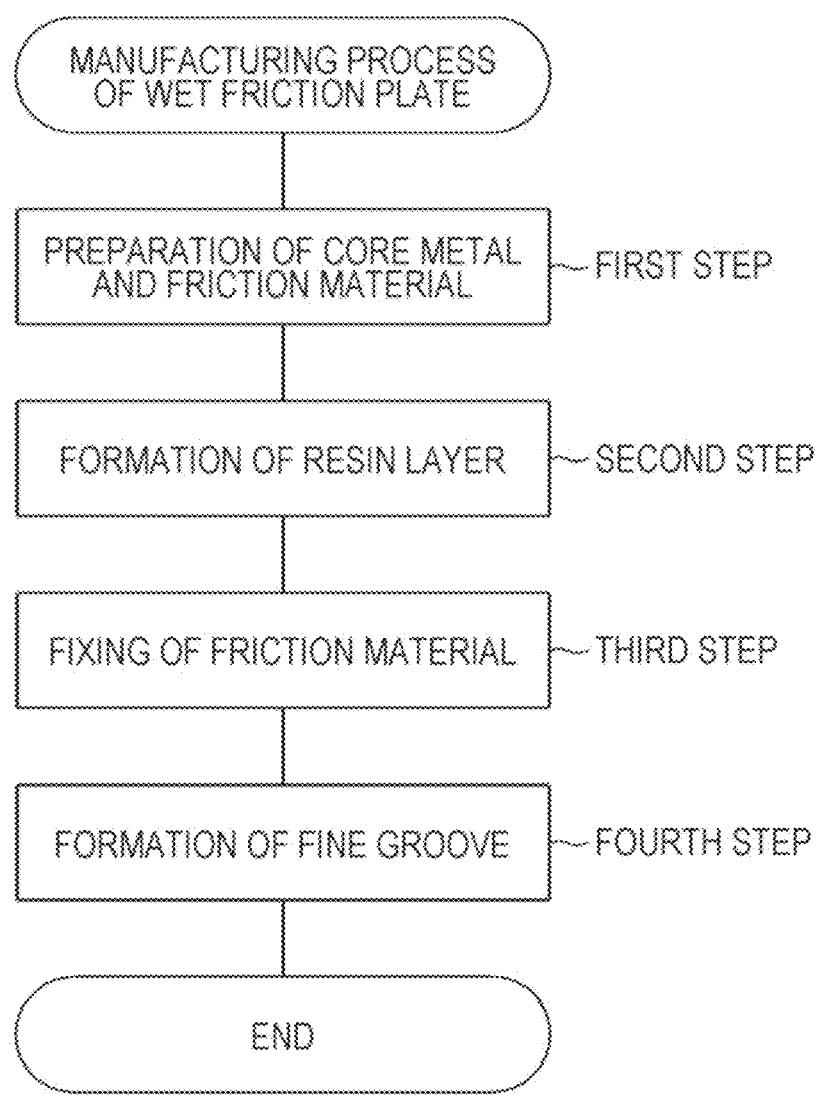
FIG. 4 is a flowchart illustrating a manufacturing process of the wet friction plate according to the present invention.

Next, a method of manufacturing the wet friction plate 200 configured as described above will be described with reference to FIG. 4. First, an operator prepares the core metal 201 and the friction material 210 as a first step. Specifically, the core metal 201 is formed into the annular shape having the spline 202 by separate press working by the operator. Further, the friction material 210 is formed in a strip shape by separate papermaking process. Since the press working and the papermaking process are conventionally known methods, descriptions thereof will be omitted.

Figure 5:
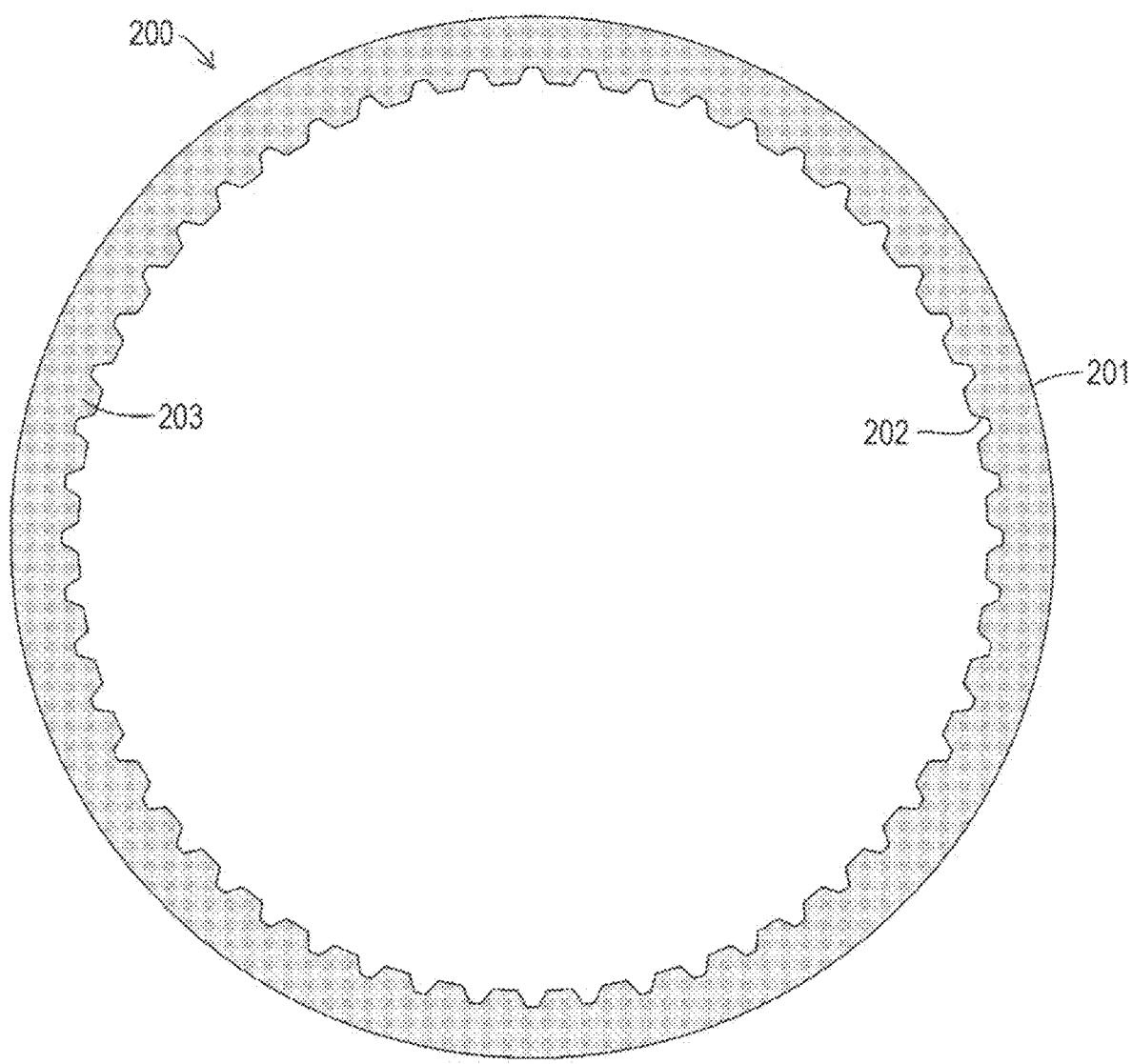
FIG. 5 is a plan view schematically illustrating a state in which a resin layer is formed on a core metal constituting the wet friction plate illustrated in FIG. 2.

Subsequently, as a second step, the operator forms the resin layer 203 on each of two plate surfaces of the core metal 201. Specifically, as illustrated in FIG. 5, the operator can form the resin layer 203 obtained by curing the resin layer raw material, by applying the resin layer raw material made of a liquid thermosetting resin, which is a raw material of the resin layer 203, to each of entire two plate surfaces of the core metal 201 using a tool such as a brush or a roller, and then by heating and drying. In this case, the operator can form the resin layer 203 by applying the raw material to the surface of the core metal 201 once or a plurality of times. Note that in FIG. 5, the resin layer 203 is shown by hatching. This second step corresponds to a resin layer forming step according to the present invention.

Subsequently, as a third step, the operator attaches the friction material 210 to the two plate surfaces of the core metal 201. Specifically, the operator applies a liquid adhesive to the entire surface of the resin layer 203 on the core metal 201 using the tool such as the brush or the roller. Thereafter, the operator places the friction material 210 thereon before the adhesive dries, and then dries the resin raw material. In this embodiment, as the adhesive, the resin layer raw material made of the liquid thermosetting resin, which is the same as the raw material of the resin layer 203, is used. That is, the resin raw material constituting the resin layer 203 is made of the adhesive. Further, in this case, the operator may form the friction material 210 into small pieces by cutting the friction material 210 extending in a strip shape while being placed on the core metal 201. Alternatively, the operator may place the friction material 210, which is formed in small pieces in advance, on the core metal 201. Thus, the friction material 210 is fixed on the resin layer 203 on the core metal 201.

In the third step, the operator may also apply the adhesive only at a position where the friction material 210 is disposed, or only in an annular shape in the circumferential direction in which the friction material 210 is disposed. Further, when the resin layer 203 is made of the adhesive, the operator may arrange the friction material 210 immediately after applying the resin layer raw material in the second step onto the core metal 201, and may cure the resin layer raw material. That is, the second step and the third step can be performed at the same time. The third step corresponds to a friction material fixing step according to the present invention.

Figure 6:
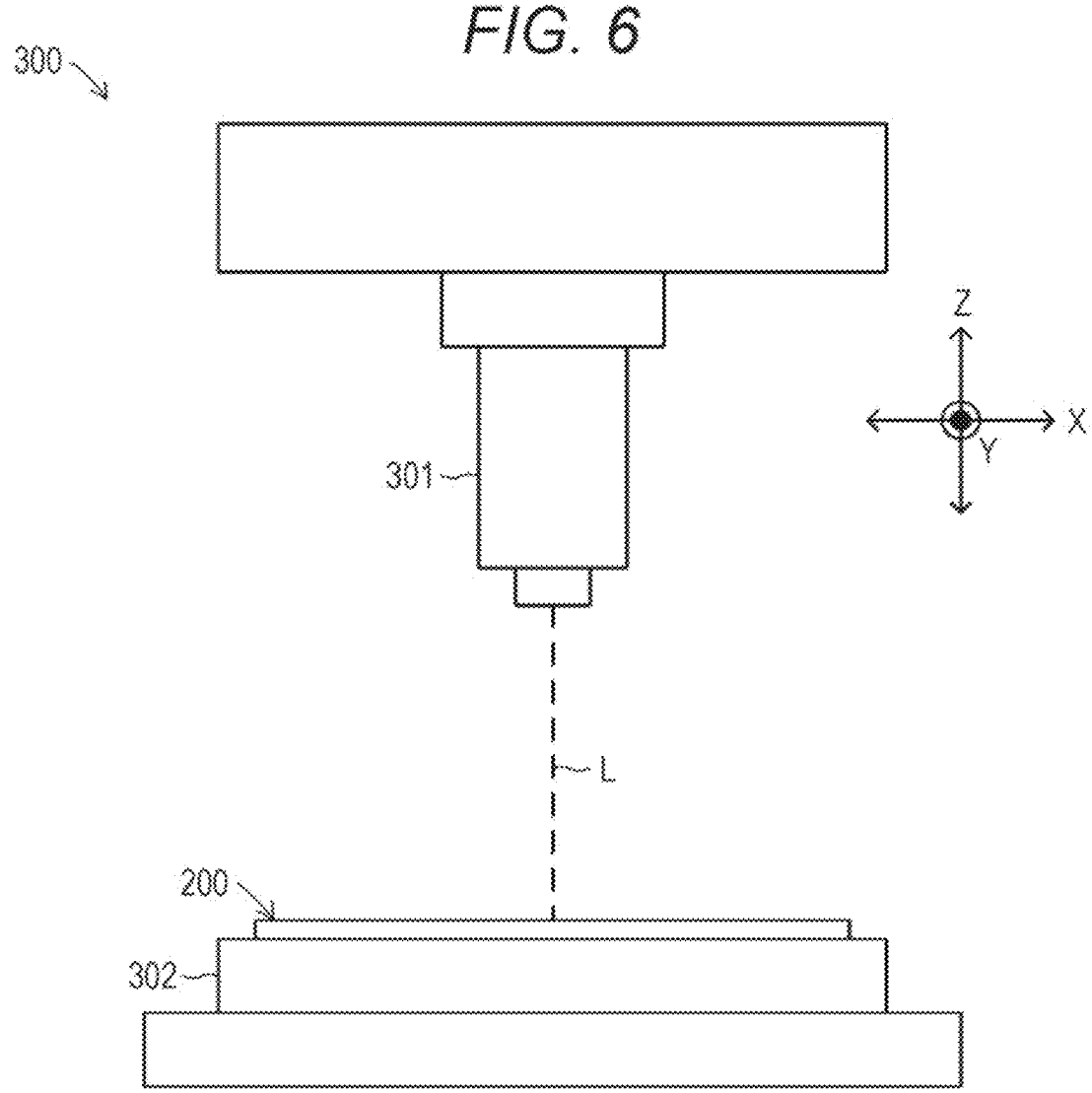
FIG. 6 is a side view schematically illustrating an outline of a configuration of a laser processing apparatus used in a fine groove forming step in the manufacturing process of the wet friction plate illustrated in FIG. 4.

Subsequently, as a fourth step, the operator forms the fine groove 211 in the friction materials 210 attached to the both surfaces of the core metal 201. In this case, the operator uses a laser processing apparatus 300 to form the fine groove 211. Here, the laser processing apparatus 300 is a mechanical apparatus for forming the fine groove 211 by irradiating the friction material 210 on the core metal 201 with a laser beam L. The laser processing apparatus 300 is a known mechanical apparatus, and detailed description thereof will be omitted. However, a configuration thereof will be briefly described with reference to FIG. 6.

The laser processing apparatus 300 is mainly configured to include a laser oscillator (not shown), a laser adjusting optical system (not shown), a laser head 301, a work table 302, and a control device (not shown). The laser oscillator is a mechanical device for emitting the laser beam L for forming the fine groove 211 in the friction material 210. In this embodiment, the laser oscillator is configured as an oscillator that emits a pulsed laser beam having a frequency of 300 kHz, an output of 60 W, and a short pulse width such as nanoseconds, picoseconds, femtoseconds, or the like. The laser adjusting optical system includes optical components including various optical elements such as a lens and a mirror, an optical fiber and the like, and the optical components guide the laser beam L emitted by the laser oscillator to the laser head 301 while making various adjustments such as correction of its beam diameter, beam shape and aberration.

The laser head 301 is an optical device that emits the laser beam L guided from the laser adjusting optical system to the work table 302 and collects it on the wet friction plate. The laser head 301 is configured to be displaceable in three axial directions of the X-axis direction, the Y-axis direction, and the Z-axis direction, which are orthogonal to each other with respect to the work table 302. The work table 302 is a device that detachably holds the core metal 201, to which the friction material 210 is attached, at a position facing the laser head 301. Note that a positional relationship between the laser head 301 and the work table 302 is relative. Therefore, as a matter of course, a configuration in which the work table 302 is displaced instead of the laser head 301 may be adopted.

The control device includes a microcomputer including a CPU, a ROM, a RAM, and the like, and comprehensively controls overall operation of the laser processing device 300. Specifically, the control device controls operations of the laser oscillator, the laser adjusting optical system, and the laser head 301 according to an instruction of the operator, and irradiates the friction material 210 with the laser beam L while displacing the laser beam, to form the fine groove 211.

In the fourth step, the operator holds the core metal 201 to which the friction material 210 is attached on the work table 302. Thereafter, the operator instructs the control device of the laser processing apparatus 300 to machine the fine groove 211. In response to the instruction, the control device emits the laser beam L from the laser head 301 while displacing the laser beam L on the friction material 210 by displacing the laser head 301 in the X-axis direction and the Y-axis direction, to form the fine groove 211.

Figure 7:
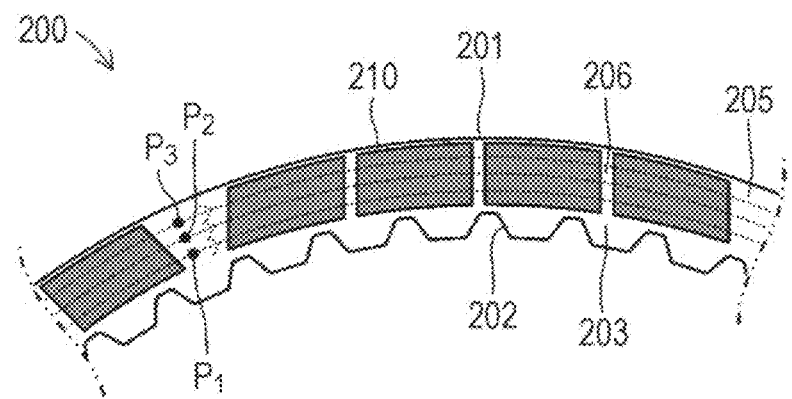
FIG. 7 is a partially enlarged plan view of the wet friction plate, illustrating three starting points of irradiating the core metal with laser beam when forming three fine grooves in the fine groove forming step in the manufacturing process of the wet friction plate illustrated in FIG. 4.

Specifically, as illustrated in FIG. 7, the control device starts irradiating the exposed portion 205 of the core metal 201 with the laser beam L. The control device displaces the laser head 301 in an annular shape starting from a position P1 while maintaining a state in which the laser light L is continuously emitted, and stops emitting the laser light L when the laser head 301 returns to the position P1. Thus, in the core metal 201, annular fine grooves 204 and 211, which are continuously connected in a plan view, are respectively formed on the surfaces of the exposed portion 205 and the friction material 210. Note that in FIG. 7, a circular orbit on which the laser beam L is displaced is shown by a broken line.

In this case, since the resin layer 203 is formed on the surface of the core metal 201, as the fine groove 204, a recessed groove having a narrower groove width and/or a shallower depth is formed as compared with a case where the resin layer 203 is not formed. According to experiments by the present inventors, it was confirmed that by forming the thickness of the resin layer 203 in a thickness of 2 μm, the depth of the groove can be reduced by 60% to 65% to be shallower. Then, the control device performs an annular displacement at other two positions P2 and P3 in a radial direction of the core metal 201 together with emission of the laser beam L in the same manner as described above, so that the annular fine grooves 204 and 211 are respectively formed. The fourth step corresponds to a fine groove forming step according to the present invention.

Subsequently, the operator takes out the core metal 201 from the work table 302. Thus, a work of forming the fine groove 211 on one surface side of the core metal 201 is completed. Therefore, the operator turns over the core metal 201 on which the fine grooves 204 and 211 are formed, and performs the same operation on the other surface, so that the three annular fine grooves 204 and 211 are formed on the other surface. Thus, the operator can form the fine grooves 211 respectively on the surfaces of the friction materials 210 on the both surfaces of the core metal 201. Thereafter, the operator performs a friction characteristic adjusting step and an inspection step to complete the wet friction plate 200. Since they are not directly related to the present invention, their description will be omitted.

(Operation of Wet Friction Plate 200)

Next, an operation of the wet friction plate 200 configured as described above will be described. As described above, the wet friction plate 200 is assembled and used in the wet multiple-plate clutch device 100. Then, as described above, the wet multiple-plate clutch device 100 is disposed between the engine and the transmission in the vehicle, and transmits and cuts off the driving force of the engine to the transmission in response to the operation of the clutch operating lever by a driver of the vehicle.

That is, when the driver (not shown) of the vehicle operates the clutch operating lever (not shown) to retract the push rod 106 (displace it to the left side of the drawing), a tip of the push rod 106 does not press the release bearing 107a, and the pressing cover 107 presses the clutch plate 103 by an elastic force of the coil spring 108c. Thus, the clutch plate 103 and the wet friction plate 200 are pressed against and frictionally connected to each other while being displaced toward a receiver 104b formed in a flange shape on the outer peripheral surface of the friction plate holder 104. As a result, the driving force of the engine transmitted to the input gear 102 is transmitted to the transmission via the clutch plate 103, the wet friction plate 200, the friction plate holder 104 and the shaft 105.

On the other hand, when the driver of the vehicle operates the clutch operating lever (not shown) to move the push rod 106 forward (displace it to the right side of the drawing), the tip of the push rod 106 presses the release bearing 107a, the pressing cover 107 is displaced to the right side of the drawing while resisting the elastic force of the coil spring 108c, and the pressing cover 107 and the clutch plate 103 are separated from each other. Thus, the clutch plate 103 and the wet friction plate 200 are displaced toward the pressing cover 107, a state in which the clutch plate 103 and the wet friction plate 200 are pressed against and connected to each other is released, and they are separated from each other. As a result, the driving force is not transmitted from the clutch plate 103 to the wet friction plate 200, and transmission of the driving force of the engine transmitted to the input gear 102 to the transmission is cut off.

In a state where the clutch plate 103 and the wet friction plate 200 are in frictional contact with each other, the fine groove 211 formed on the surface of the friction material 210 improves the discharge property of the lubricating oil present on the friction material 210 to the outside of the friction material 210. Further, in a state where the clutch plate 103 and the wet friction plate 200 are separated from each other, the fine groove 211 formed on the surface of the friction material 210 improves the retention property by the friction material 210 of the lubricating oil present on the friction material 210.

As can be understood from the above description of the operation, according to the above embodiment, in the wet friction plate 200 and the method for manufacturing the wet friction plate, the fine groove 211 is formed on the surface of the friction material 210 by continuously emitting the laser beam L without interruption between the exposed portion 205 on the plate surface of the core metal 201 and the friction material 210. Therefore, positioning accuracy of the core metal 201 with respect to the laser head 301 that emits the laser beam L can be relaxed. Further, irradiation control of the laser beam L can also be simplified. Therefore, efficiency of the work of forming the fine groove 211 on the friction material 210 can be improved.

Furthermore, the implementation of the present invention is not limited to the above-described embodiment, and various modifications can be made without departing from the object of the present invention. In the modifications described below, the same components as the wet friction plate 200 in the above embodiment are denoted by the same reference numerals as the reference numerals given to the wet friction plate 200, and descriptions thereof will be omitted.

For example, in the above embodiment, the resin layer 203 is made of a resin material having adhesiveness to the friction material 210. However, the resin layer 203 does not necessarily have to have adhesiveness. The resin layer 203 may have a function of hindering progress of the laser beam L or reducing light intensity of the laser beam L. Therefore, the resin layer 203 can be made of a resin material that does not have adhesiveness to the friction material 210. In this case, the friction material 210 is fixed on the core metal 201 by the adhesive applied onto the core metal 201 or onto the resin layer 203 made of the resin material having no adhesiveness.

In the above embodiment, the resin layer 203 is formed to be transparent or translucent to the extent that the surface of the core metal 201 can be visually recognized by a human.

However, the resin layer 203 can also be formed to be opaque so that the surface of the core metal 201 cannot be visually recognized. In this case, the resin layer 203 can be formed in a mirror surface color or a metallic color that reflects the laser beam L, in addition to a dark color such as black.

Figure 8:
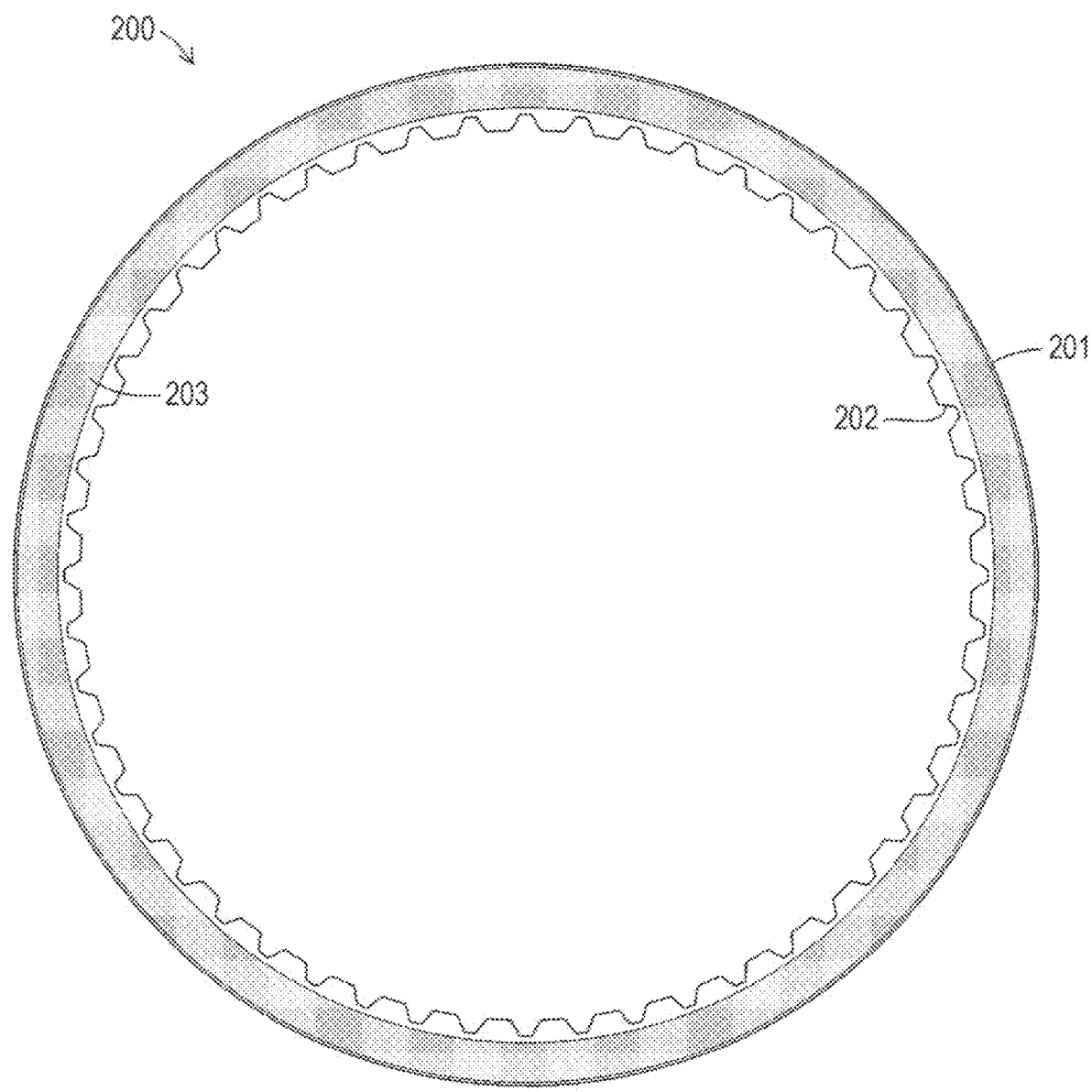
FIG. 8 is a plan view schematically illustrating a state in which the resin layer is formed on the core metal constituting the wet friction plate according to a modification of the present invention.

In the above embodiment, the resin layer 203 is formed on each of the entire two plate surfaces of the core metal 201. However, the resin layer 203 may be formed on a portion in which the friction material 210 is not provided on the plate surface of the core metal 201, that is, on at least a part of the exposed portion 205 which is a portion exposed to the outside, more specifically, on a path where the laser beam L is displaced when the fine groove 211 is formed in the friction material 210. Therefore, the resin layer 203 may be formed only on the exposed portion 205 in which the friction material 210 is not provided on the plate surface of the core metal 201. Alternatively, as illustrated in FIG. 8, the resin layer 203 may also be formed only in a region extending in an annular shape in the circumferential direction, corresponding to a radial range of the fine groove 211 formed in the friction material 210. Note that in FIG. 8, the resin layer 203 is shown by hatching.

In the above embodiment, the wet friction plate 200 is configured such that the resin layer 203 is formed on each of the two plate surfaces of the core metal 201. Thus, in the wet friction plate 200, it is possible to prevent or reduce the formation of the fine groove 211 in the exposed portion 205 of the core metal 201. However, if it is permissible for the fine groove 211 to be formed in the exposed portion 205 of the core metal 201, the wet friction plate 200 can also be configured such that the resin layer 203 is omitted. This can simplify the configuration of the wet friction plate 200. Further, since the resin layer forming step can be omitted also in the manufacturing process of the wet friction plate, a manufacturing load can be reduced.

In the wet friction plate 200, the resin layer 203 formed on each of the two plate surfaces of the core metal 201 can also be removed after the fine groove 204 is formed. Specifically, the operator can perform a resin layer removing step of removing the resin layer 203 formed on each of the two plate surfaces of the core metal 201 by using a chemical such as an organic solvent or by cutting. This can prevent an increase in weight due to formation of the resin layer 203 and deterioration in appearance due to the resin layer 203 remaining.

Figure 9:
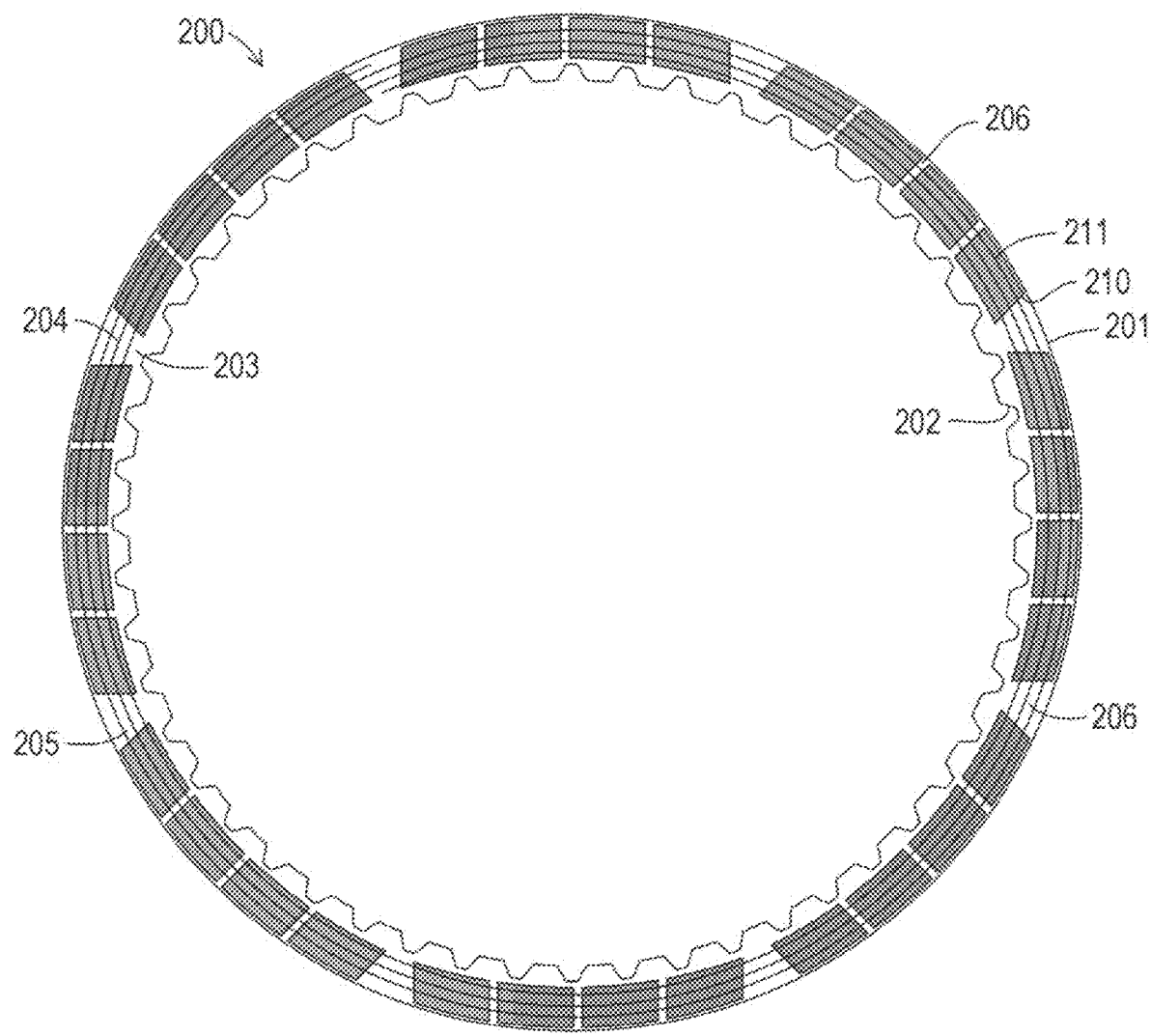
FIG. 9 is a plan view schematically illustrating the external configuration of the wet friction plate according to another modification of the present invention.
Figure 10:
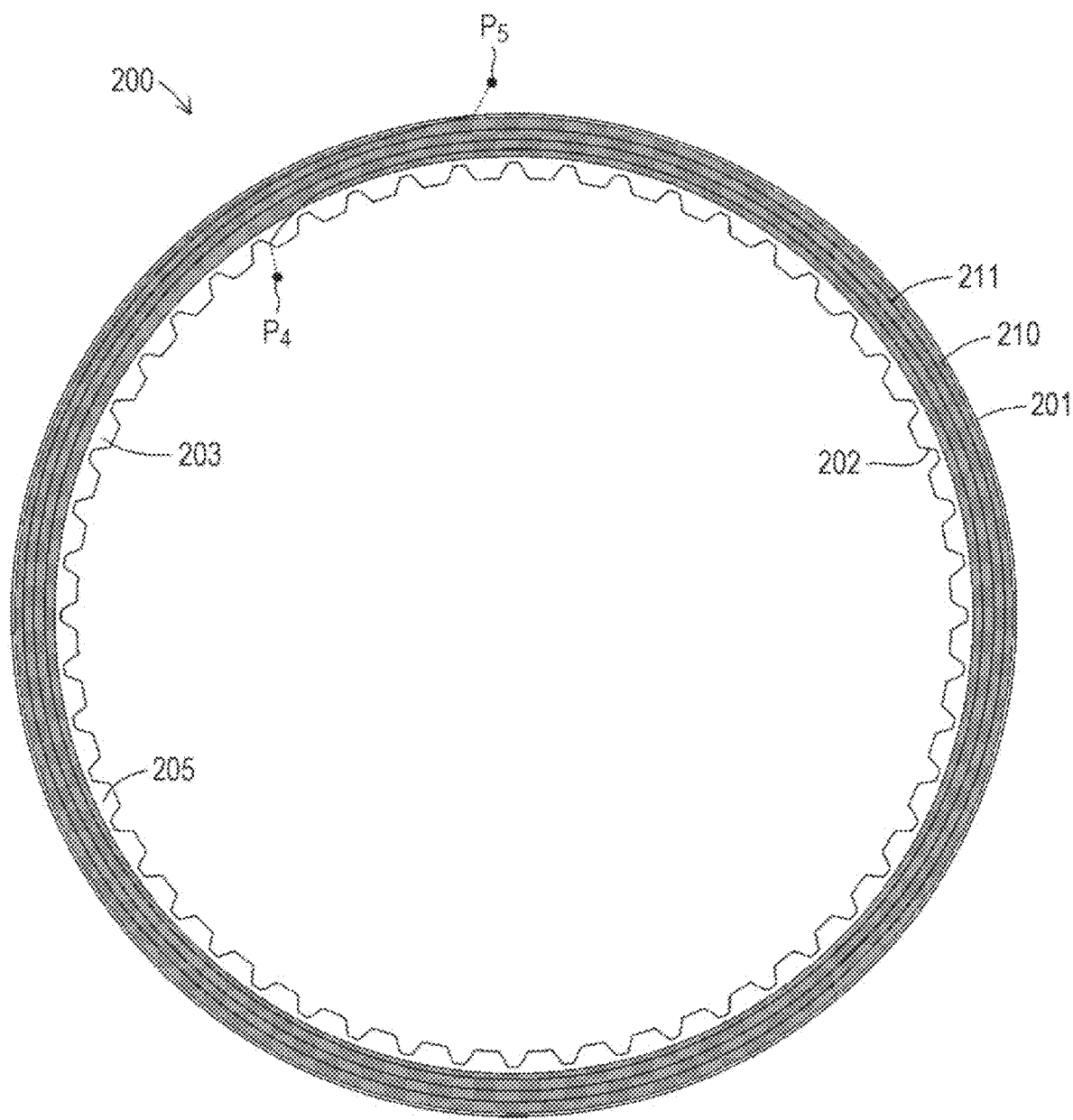
FIG. 10 is a plan view schematically illustrating the external configuration of the wet friction plate according to another modification of the present invention.
Figure 11:
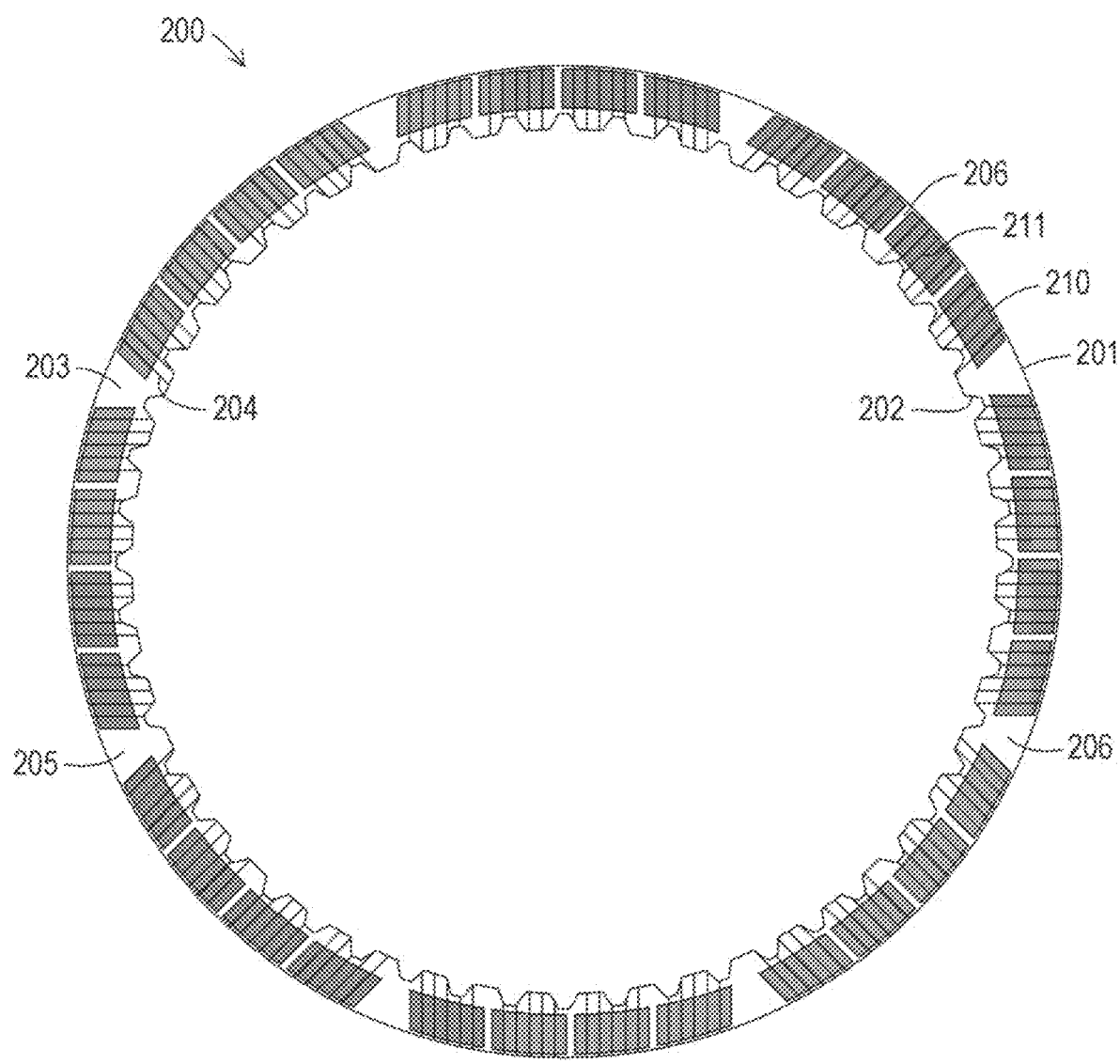
FIG. 11 is a plan view schematically illustrating the external configuration of the wet friction plate according to another modification of the present invention.

In the above embodiment, the fine groove 211 is formed in an annular shape that intermittently extends in the circumferential direction of the core metal 201, and is formed in a continuous annular shape together with the fine groove 204 as a whole. However, the fine groove 211 is formed in a shape that can control the retention property and discharge property of the lubricating oil on the friction material 210. Therefore, the fine groove 211 can be formed in a shape other than the annular shape, for example, in a spiral shape that extends intermittently in the circumferential direction of the core metal 201 as illustrated in each of FIGS. 9 and 10, and can be formed in a continuous spiral shape together with the fine groove 204 as a whole. Further, as illustrated in FIG. 11, the fine groove 211 may also be formed in a linear shape or a curved shape in the radial direction of the core metal.

In the above embodiment, the friction material 210 is provided by arranging a plurality of small pieces intermittently in the circumferential direction of the core metal 201 via the gap forming the oil groove 206. However, the friction material 210 is appropriately provided according to a specification of the wet multiple-plate clutch device 100. Therefore, as illustrated in FIG. 10, the friction material 210 can also be formed in an annular shape that continuously extends in the circumferential direction of the core metal 201. That is, the wet friction plate 200 can be configured so that the oil groove 206 is omitted. In this case, the fine groove 211 can be formed in an annular shape or a spiral shape that extends continuously or intermittently in the circumferential direction of the core metal 201.

In the above embodiment, in the wet friction plate 200, the fine groove 204 is formed in the exposed portion 205 of the core metal 201. However, depending on formation mode of the resin layer 203 formed on the exposed portion 205, it is possible to prevent the fine groove 204 from being formed in the exposed portion 205. Specifically, by increasing the thickness of the resin layer 203 or by reducing permeability of the laser beam L to improve reflectance or absorptance of the light, it is possible to prevent the fine groove 204 from being formed in the exposed portion 205. Note that the fine groove 204 may be formed in the resin layer 203 due to heat when the laser beam L is absorbed by the resin layer 203 or when the fine groove 204 is formed in the exposed portion 205.

In the configuration described in the above embodiment, in the fine groove forming step of the fourth step, the laser beam L is started to be emitted on the exposed portion 205 of the core metal 201, and the laser beam L is displaced and irradiated onto the friction material 210. This prevents the friction material 210 on the core metal 201 from being irradiated with the unstable laser beam L at the time of emission and immediately after the emission, so that the fine groove 211 can be stably formed. However, in the fine groove forming step, as illustrated in FIG. 10, the emission of the laser beam L is started at a position P4 outside the core metal 201 (inside the core metal 201 in FIG. 10), and the laser light L can also be displaced and irradiated onto the exposed portion 205 of the core metal 201 or onto the friction material 210. This prevents the exposed portion 205 of the core metal 201 or the friction material 210 from being irradiated with the unstable laser beam at the time of emission and immediately after the emission, so that the fine grooves 204 and 211 can be stably formed. In the wet friction plate 200 illustrated in FIG. 10, a spiral fine groove 211 is continuously formed from the inner peripheral side to the outer peripheral side of the core metal 201, and then the emission of the laser beam L is stopped after the laser beam L is continuously emitted through an outer peripheral portion of the friction material 210 up to a position P5 outside an outer peripheral portion of the core metal 201.

In the above embodiment, the wet friction plate 200 is held by the friction plate holder 104, which is rotationally driven integrally with the shaft 105. That is, the wet friction plate 200 is used as an opposing plate, and the opposing plate is disposed to face the clutch plate 103 that is rotationally driven by the rotational driving force of the engine, and is rotationally driven integrally with the shaft 105 that is an output shaft of the wet multiple-plate clutch device 100. However, the wet friction plate 200 can also be used as the clutch plate 103 as a drive side plate that is rotationally driven by the rotational driving force of the engine.

In the above embodiment, the laser processing apparatus 300 is configured such that the laser head 301 can be displaced in three axial directions, which are orthogonal to each other in the X-axis direction, the Y-axis direction, and the Z-axis direction. However, if the laser machining apparatus 300 is configured such that the fine groove 211 can be formed on the friction material 210 on the core metal 201, another configuration can be employed. Therefore, the laser processing apparatus 300 can be configured such that a galvano scanner or a polygon mirror is provided in the laser head 301 to scan the laser beam L in the X-axis direction and the Y-axis direction, in place of or in addition to displacement of the laser head 301 and/or the work table 302. Further, the laser processing apparatus 300 can also be configured to hold the core metal 201 to which the friction material 210 is attached on the work table 302 configured to be movable or fixed, such that the core metal 201 on the work table 302 is rotated or scanned with the laser beam L in the X-axis direction and the Y-axis direction.

In the above embodiment, an example in which the wet friction plate according to the present invention is used as the wet friction plate 200 used in the wet multiple-plate clutch device 100 has been described. However, the wet friction plate according to the present invention may be any wet friction plate used in oil. The wet friction plate according to the present invention can also be used as the wet friction plate used in a braking device for braking rotational motion by the prime mover in addition to the wet multiple-plate clutch device 100.

LIST OF REFERENCE SIGNS

L: Laser beam, $P_1$, $P_2$, $P_3$: Irradiation start position of laser beam L on core metal 201, $P_4$: Irradiation start position of laser beam L outside core metal 201, P5: Irradiation stop position of laser beam L outside core metal 201, 100: Wet multiple-plate clutch device, 101: Housing, 102: Input gear, 102a: Torque damper, 102b: Rivet, 103: Clutch plate, 104: Friction plate holder, 104a: Tubular support column, 104b: Receiver, 105: Shaft, 105a: Needle bearing, 105b: Nut, 106: Push rod, 107: Pressing cover, 107a: Release bearing, 108a: Bolt, 108b: Receiving plate, 108c: Coil spring, 200: Wet friction plate, 201: Core metal, 202: Spline, 203: Resin layer, 204: Fine groove, 205: Exposed portion, 206: Oil groove, 210: Friction material, 211: Fine groove, 300: Laser processing apparatus, 301: Laser head, 302: Work table.

The invention claimed is:

1. A wet friction plate comprising:
    a core metal formed in a flat plate annular shape; and
    a plurality of friction materials is provided in a circumferential direction on a surface of the core metal with a gap interposed between two of the plurality of friction materials, wherein
    a first recessed fine groove is formed in an exposed portion of a plate surface of the core metal and a second recessed fine groove is formed on a surface of at least one of the plurality of friction materials in a state that both the first recessed fine groove and the second recessed fine groove are continuously connected in a plan view between the exposed portion and the at least one of the plurality of friction materials.

2. The wet friction plate according to claim 1, wherein the first recessed fine groove and the second recessed fine groove are formed in a recessed shape continuously connected in the plan view between the gap on the core metal and the friction materials adjacent to each other with the gap interposed therebetween.

3. The wet friction plate according to claim 1, wherein a resin layer made of a resin material is further formed on at least a part of the exposed portion of the core metal.

4. The wet friction plate according to claim 3, wherein the resin layer is formed on an entire surface of the core metal, and
the plurality of friction materials are attached onto the resin layer.

5. The wet friction plate according to claim 3, wherein the resin layer is formed to be transparent or translucent.

6. The wet friction plate according to claim 1, wherein the first recessed fine groove and the second recessed fine groove are formed to extend spirally in the circumferential direction in the core metal.

7. A wet multiple-plate clutch device in which an opposing plate is disposed to face a drive side plate that is rotationally driven by a prime mover through a gap and a lubricating oil, and a rotational driving force is transmitted or cut off between the opposing plate and the drive side plate when the opposing plate and the drive side plate are in close contact with each other or separated from each other, wherein
    at least one of the drive side plate and the opposing plate is the wet friction plate according to claim 1.

8. A wet friction plate in which a friction material is provided in a circumferential direction on a surface of a core metal formed in a flat plate annular shape, wherein
    a recessed fine groove is formed in the friction material on the core metal, and
    a resin layer made of a resin material is formed on at least a part of an exposed portion of a plate surface of the core metal on which no friction material is provided; wherein the resin layer comprises a second recessed fine groove on a surface of the resin layer on which no friction material is provided, the second recessed fine groove being continuously connected to the recessed fine groove formed in the friction material.

* * * * *